(12) United States Patent
Habu et al.

(10) Patent No.: US 12,183,512 B2
(45) Date of Patent: Dec. 31, 2024

(54) DIELECTRIC COMPOSITION AND MULTILAYER CERAMIC CAPACITOR

(71) Applicant: Murata Manufacturing Co., Ltd., Nagaokakyo (JP)

(72) Inventors: Daiki Habu, Nagaokakyo (JP); Keisuke Nomura, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 101 days.

(21) Appl. No.: 17/964,198

(22) Filed: Oct. 12, 2022

(65) Prior Publication Data

US 2023/0053290 A1 Feb. 16, 2023

Related U.S. Application Data

(63) Continuation of application No. PCT/JP2021/011626, filed on Mar. 22, 2021.

(30) Foreign Application Priority Data

May 12, 2020 (JP) .................. 2020-083615

(51) Int. Cl.
*H01G 4/12* (2006.01)
(52) U.S. Cl.
CPC .................. *H01G 4/1218* (2013.01)
(58) Field of Classification Search
CPC ........ H01G 4/30; H01G 4/1218; H01G 4/012; H01G 4/12

(Continued)

(56) References Cited

U.S. PATENT DOCUMENTS

| 7,697,263 B2* | 4/2010 | Bridger .................. H01C 7/025 361/321.1 |
| 2003/0134738 A1* | 7/2003 | Furukawa ............. C04B 35/462 501/137 |

(Continued)

FOREIGN PATENT DOCUMENTS

| CN | 105732025 A | 7/2016 |
| JP | H03285209 A | 12/1991 |

(Continued)

OTHER PUBLICATIONS

International Search Report in PCT/JP2021/011626, mailed Jun. 8, 2021, 3 pages.

(Continued)

*Primary Examiner* — Arun Ramaswamy
(74) *Attorney, Agent, or Firm* — ArentFox Schiff LLP

(57) ABSTRACT

A dielectric composition that contains a first complex oxide represented by $(Bi_xNa_{1-x})TiO_3$—$CaTiO_3$ and having a perovskite structure as a main component; and at least one second complex oxide having a perovskite structure selected from the group consisting of $BaZrO_3$, $SrZrO_3$, $CaZrO_3$, $NaNbO_3$, and $NaTaO_3$ as an auxiliary component. A tolerance factor t when the at least one second complex oxide is $BaZrO_3$, $NaNbO_3$, or $NaTaO_3$ is $0.9016 \leq t \leq 0.9035$, a tolerance factor t when the at least one second complex oxide is $SrZrO_3$ is $0.9005 \leq t \leq 0.9025$, and a tolerance factor t when the at least one second complex oxide is $CaZrO_3$ is $0.9000 \leq t \leq 0.9020$.

16 Claims, 13 Drawing Sheets

(58) Field of Classification Search
USPC ......... 361/301.4, 311, 321.1, 321.4; 501/136
See application file for complete search history.

(56) References Cited

U.S. PATENT DOCUMENTS

| | | | |
|---|---|---|---|
| 2015/0348709 A1* | 12/2015 | Tauchi | G06F 17/10 |
| | | | 501/139 |
| 2015/0353430 A1 | 12/2015 | Natsui et al. | |
| 2018/0155249 A1 | 6/2018 | Terada et al. | |
| 2019/0003077 A1* | 1/2019 | Fratello | C30B 29/22 |

FOREIGN PATENT DOCUMENTS

| | | |
|---|---|---|
| JP | 2006206362 A | 8/2006 |
| JP | 2019089705 A | 6/2019 |
| JP | 6538882 B2 | 7/2019 |
| WO | 2014157023 A1 | 10/2014 |

OTHER PUBLICATIONS

Nguyen et al., "Effect of SrTiO3 modification on dielectric, phase transition and piezoelectric properties of lead free Bi0.5Na0.5TiO3—CaTiO3—SrTiO3 piezoelectric ceramics," Journal of the Korean Ceramic Society, 2020, vol. 57, pp. 570-577.

\* cited by examiner

FIG. 6(a)
FIG. 6(b)
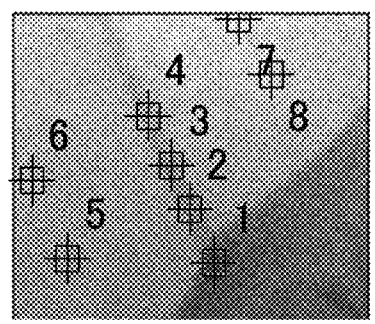
FIG. 6(c)
| MEASUREMENT POINT | MEASUREMENT POSITION | Na-K | Ca-K | Ti-K | Mn-K | Zr-L | Ba-L | Bi-L |
|---|---|---|---|---|---|---|---|---|
| 1 | TRIPLE POINT | 43.2 | 7.1 | 97.0 | 0.0 | 3.0 | 2.8 | 36.8 |
| 2 | GRAIN BOUNDARY | 43.6 | 7.1 | 97.0 | 0.3 | 2.5 | 2.9 | 47.8 |
| 3 |  | 47.5 | 8.1 | 97.0 | 0.1 | 2.9 | 1.5 | 44.4 |
| 4 |  | 46.8 | 8.0 | 97.0 | 0.2 | 1.8 | 1.7 | 46.7 |
| 5 | INSIDE GRAIN | 49.5 | 12.1 | 97.0 | 0.4 | 2.8 | 1.3 | 39.1 |
| 6 |  | 49.2 | 11.1 | 97.0 | 0.6 | 3.8 | 2.0 | 41.0 |
| 7 |  | 48.9 | 11.1 | 97.0 | 0.1 | 3.7 | 1.5 | 38.9 |
| 8 |  | 47.6 | 10.3 | 97.0 | 0.6 | 2.6 | 0.7 | 37.6 |

FIG. 7(a)
FIG. 7(b)
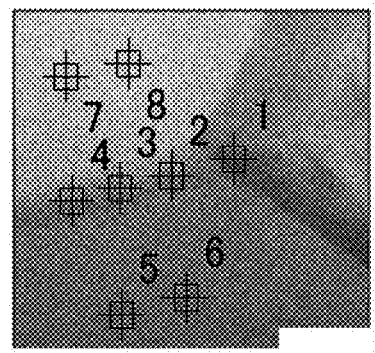
FIG. 7(c)
| MEASUREMENT POINT | MEASUREMENT POSITION | Na-K | Ca-K | Ti-K | Mn-K | Zr-L | Ba-L | Bi-L |
|---|---|---|---|---|---|---|---|---|
| 1 | TRIPLE POINT | 43.7 | 8.3 | 97.0 | 0.2 | 2.4 | 2.4 | 41.7 |
| 2 | GRAIN BOUNDARY | 44.4 | 9.1 | 97.0 | 0.1 | 2.4 | 1.1 | 42.9 |
| 3 | | 43.8 | 9.7 | 97.0 | 0.2 | 1.9 | 2.4 | 41.9 |
| 4 | | 44.4 | 9.0 | 97.0 | 0.2 | 1.9 | 2.8 | 42.3 |
| 5 | INSIDE GRAIN | 45.9 | 11.9 | 97.0 | 0.6 | 3.3 | 2.1 | 39.6 |
| 6 | | 45.6 | 11.7 | 97.0 | 0.8 | 3.6 | 2.2 | 44.4 |
| 7 | | 45.6 | 11.7 | 97.0 | 0.3 | 2.8 | 1.7 | 37.9 |
| 8 | | 45.9 | 12.3 | 97.0 | 0.6 | 2.2 | 1.4 | 42.8 |

FIG. 8(a)
FIG. 8(b)
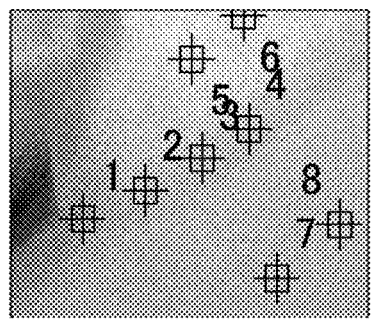
FIG. 8(c)
| MEASUREMENT POINT | MEASUREMENT POSITION | Na-K | Ca-K | Ti-K | Mn-K | Zr-L | Ba-L | Bi-L |
|---|---|---|---|---|---|---|---|---|
| 1 | CENTER INSIDE GRAIN | 44.2 | 11.6 | 97.0 | 0.3 | 4.9 | 2.6 | 35.0 |
| 2 | | 41.1 | 11.8 | 97.0 | 0.7 | 5.0 | 1.8 | 34.5 |
| 3 | | 42.6 | 12.2 | 97.0 | 0.3 | 4.9 | 2.6 | 33.8 |
| 4 | | 45.2 | 11.4 | 97.0 | 0.5 | 5.7 | 1.6 | 34.2 |

FIG. 9(a)
FIG. 9(b)
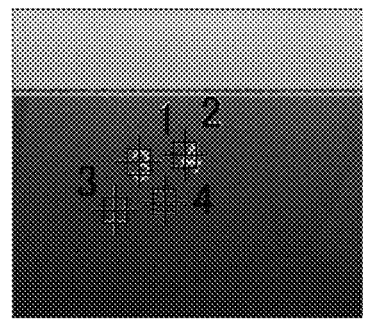
FIG. 9(c)
| MEASUREMENT POINT | MEASUREMENT POSITION | Na-K | Ca-K | Ti-K | Mn-K | Zr-L | Ba-L | Bi-L |
|---|---|---|---|---|---|---|---|---|
| 1 | CENTER INSIDE GRAIN | 44.2 | 11.6 | 97.0 | 0.3 | 4.9 | 2.6 | 35.0 |
| 2 | | 41.1 | 11.8 | 97.0 | 0.7 | 5.0 | 1.8 | 34.5 |
| 3 | | 42.6 | 12.2 | 97.0 | 0.3 | 4.9 | 2.6 | 33.8 |
| 4 | | 45.2 | 11.4 | 97.0 | 0.5 | 5.7 | 1.6 | 34.2 |

FIG. 10(a)
FIG. 10(b)
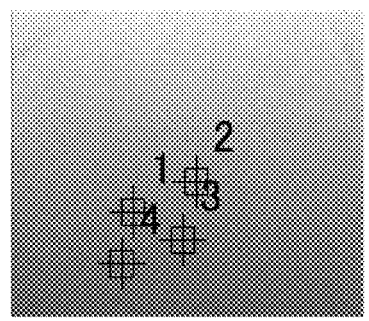
FIG. 10(c)
| MEASUREMENT POINT | MEASUREMENT POSITION | Na-K | Ca-K | Ti-K | Mn-K | Zr-L | Ba-L | Bi-L |
|---|---|---|---|---|---|---|---|---|
| 1 | CENTER INSIDE GRAIN | 38.2 | 11.8 | 97.0 | 0.6 | 4.0 | 2.0 | 37.4 |
| 2 | | 39.2 | 11.9 | 97.0 | 0.7 | 4.6 | 2.0 | 36.7 |
| 3 | | 36.5 | 11.7 | 97.0 | 0.6 | 4.8 | 2.6 | 37.5 |
| 4 | | 35.2 | 12.0 | 97.0 | 1.0 | 4.1 | 2.1 | 35.5 |

FIG. 11(a)
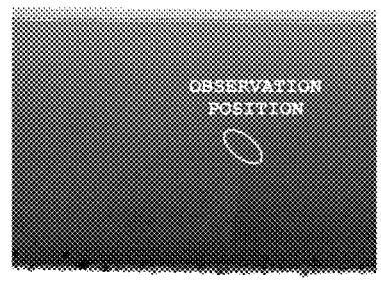
FIG. 11(b)
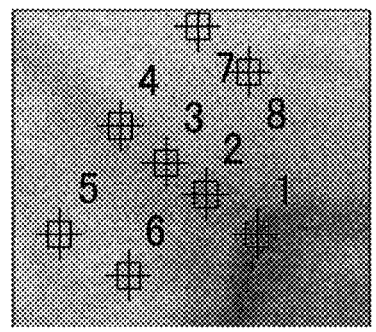
FIG. 11(c)
| MEASUREMENT POINT | MEASUREMENT POSITION | Na-K | Ca-K | Ti-K | Mn-K | Zr-L | Bi-L |
|---|---|---|---|---|---|---|---|
| 1 | TRIPLE POINT | 40.3 | 8.1 | 97.0 | 0.0 | 0.0 | 46.1 |
| 2 | GRAIN BOUNDARY | 37.1 | 10.0 | 97.0 | 0.0 | 0.0 | 43.4 |
| 3 | | 35.9 | 11.1 | 97.0 | 0.0 | 0.0 | 41.4 |
| 4 | | 36.8 | 10.8 | 97.0 | 0.1 | 0.0 | 42.2 |
| 5 | INSIDE GRAIN | 37.1 | 15.3 | 97.0 | 0.7 | 0.0 | 41.8 |
| 6 | | 39.3 | 15.3 | 97.0 | 0.5 | 0.0 | 40.9 |
| 7 | | 36.6 | 14.4 | 97.0 | 0.8 | 0.0 | 39.0 |
| 8 | | 37.4 | 13.8 | 97.0 | 0.5 | 2.8 | 39.0 |

FIG. 12(a)
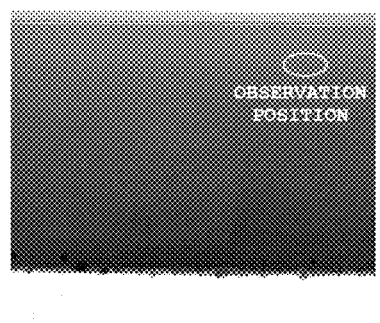
FIG. 12(b)
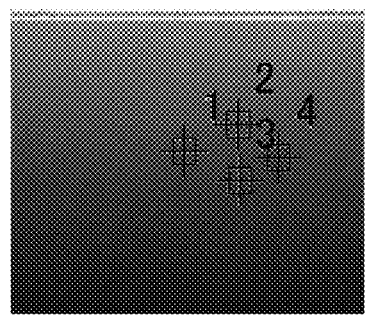
FIG. 12(c)
| MEASUREMENT POINT | MEASUREMENT POSITION | Na-K | Ca-K | Ti-K | Mn-K | Zr-L | Bi-L |
|---|---|---|---|---|---|---|---|
| 1 | CENTER INSIDE GRAIN | 48.4 | 15.0 | 97.0 | 0.4 | 4.0 | 32.3 |
| 2 | | 54.7 | 15.3 | 97.0 | 0.4 | 0.0 | 32.5 |
| 3 | | 46.9 | 15.9 | 97.0 | 0.6 | 3.6 | 34.7 |
| 4 | | 46.8 | 15.6 | 97.0 | 0.6 | 3.5 | 34.2 |

FIG. 13(a)
FIG. 13(b)
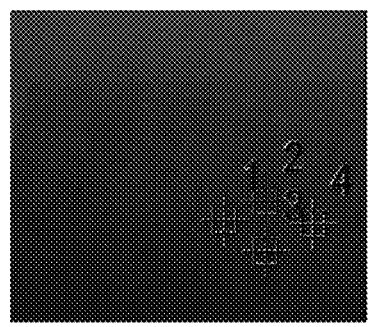
FIG. 13(c)
| MEASUREMENT POINT | MEASUREMENT POSITION | Na-K | Ca-K | Ti-K | Mn-K | Zr-L | Bi-L |
|---|---|---|---|---|---|---|---|
| 1 | CENTER INSIDE GRAIN | 35.2 | 15.4 | 97.0 | 0.7 | 4.1 | 35.6 |
| 2 | | 38.0 | 15.3 | 97.0 | 0.7 | 4.3 | 36.0 |
| 3 | | 35.1 | 14.9 | 97.0 | 0.6 | 3.6 | 36.3 |
| 4 | | 36.7 | 15.2 | 97.0 | 0.4 | 2.9 | 36.6 |

| MEASUREMENT POINT | MEASUREMENT POSITION | Na-K | Ca-K | Ti-K | Mn-K | Zr-L | Bi-L |
|---|---|---|---|---|---|---|---|
| 1 | CENTER INSIDE GRAIN | 44.5 | 15.9 | 97.0 | 0.7 | 4.1 | 37.2 |
| 2 | | 43.6 | 14.7 | 97.0 | 0.9 | 591.6 | 33.5 |
| 3 | | 42.8 | 15.3 | 97.0 | 0.5 | 2.7 | 37.1 |
| 4 | | 43.2 | 15.8 | 97.0 | 0.6 | 0.0 | 38.1 |

DIELECTRIC COMPOSITION AND MULTILAYER CERAMIC CAPACITOR

CROSS REFERENCE TO RELATED APPLICATIONS

The present application is a continuation of International application No. PCT/JP2021/011626, filed Mar. 22, 2021, which claims priority to Japanese Patent Application No. 2020-083615, filed May 12, 2020, the entire contents of each of which are incorporated herein by reference.

FIELD OF THE INVENTION

The present invention relates to a dielectric composition and a multilayer ceramic capacitor.

BACKGROUND OF THE INVENTION

An electronic component including a dielectric such as a multilayer ceramic capacitor is known. As a material constituting the dielectric, a dielectric composition containing a complex oxide having a perovskite structure such as barium titanate is known.

Patent Document 1 describes a dielectric composition containing a complex oxide represented by $(Bi_aNa_bSr_cLn_d)TiO_3$ as a main component and containing K as a first auxiliary component and at least one selected from the group consisting of Cu, Zn, and Co as a second auxiliary component. This dielectric composition described in Patent Document 1 has a high relative permittivity in the case of applying a DC bias of 8 kV/mm.

Patent Document 1: JP 6538882 B2

SUMMARY OF THE INVENTION

Since an electronic component such as a multilayer ceramic capacitor has been thinned, it is desired to develop a dielectric composition having a sufficiently high relative permittivity, for example, a high relative permittivity of 1000 or more at 25° C. in the case of applying a DC bias higher than 8 kV/mm, for example, a DC bias of 10 kV/mm.

The electrostatic capacitance of the multilayer ceramic capacitor changes depending on a temperature, but in practice, a rate of change in electrostatic capacitance in a predetermined temperature range is preferably small. As an example of a standard for the rate of change in electrostatic capacitance in a predetermined temperature range, there is a standard X7T defined by The Electronic Industries Alliance (EIA), but the current standard only compensates for the rate of change in electrostatic capacitance in a state where a DC bias is not applied. For example, the rate of change in electrostatic capacitance in a predetermined temperature range in a state of applying a DC bias of 10 kV/mm is more desirably small. However, Patent Document 1 does not describe whether or not the dielectric composition satisfies the standard X7T in a state of applying a DC bias of 10 kV/mm.

The present invention has been made to solve the above problems, and an object thereof is to provide a dielectric composition having a high relative permittivity of 1000 or more at 25° C. in the case of applying a DC bias of 10 kV/mm and having a rate of change in electrostatic capacitance satisfying the standard X7T, and a multilayer ceramic capacitor including such a dielectric composition.

A dielectric composition of the present invention contains a first oxide represented by $(Bi_xNa_{1-x})TiO_3$—$CaTiO_3$ (x satisfies $0<x<1$) and having a perovskite structure as a main component; and at least one second oxide having a perovskite structure selected from the group consisting of $BaZrO_3$, $SrZrO_3$, $CaZrO_3$, $NaNbO_3$, and $NaTaO_3$ as an auxiliary component, in which a tolerance factor t when the at least one second complex oxide is $BaZrO_3$, $NaNbO_3$, or $NaTaO_3$ is $0.9016 \leq t \leq 0.9035$, a tolerance factor t when the at least one second complex oxide is $SrZrO_3$ is $0.9005 \leq t \leq 0.9025$, and a tolerance factor t when the at least one second complex oxide is $CaZrO_3$ is $0.9000 \leq t \leq 0.9020$.

According to the dielectric composition and the multilayer ceramic capacitor of the present invention, a high relative permittivity of 1000 or more at 25° C. is obtained in the case of applying a DC bias of 10 kV/mm, and a rate of change in electrostatic capacitance satisfies the standard X7T.

BRIEF EXPLANATION OF THE DRAWINGS

FIGS. 6(a) to 6(c) are views showing results of confirming the structural characteristics of a multilayer ceramic capacitor of the present invention containing $BaZrO_3$ as an auxiliary component, where FIG. 6(a) shows an observation position by energy dispersive X-ray analysis (EDX) in a bright field image with a scanning transmission electron microscope, FIG. 6(b) shows a plurality of measurement points in the observation position, and FIG. 6(c) shows contents of respective elements measured at the plurality of measurement points, respectively.

FIGS. 7(a) to 7(c) are views showing results of confirming the structural characteristics at an observation position different from that in FIGS. 6(a) to 6(c), where FIG. 7(a) shows an observation position by energy dispersive X-ray analysis in a bright field image with a scanning transmission electron microscope, FIG. 7(b) shows a plurality of measurement points in the observation position, and FIG. 7(c) shows contents of respective elements measured at the plurality of measurement points, respectively.

FIGS. 8(a) to 8(c) are views showing results of confirming the structural characteristics at an observation position different from those in FIGS. 6(a)-6(c) and 7(a)-7(c), where FIG. 8(a) shows an observation position by energy dispersive X-ray analysis in a bright field image with a scanning transmission electron microscope, FIG. 8(b) shows a plurality of measurement points in the observation position, and FIG. 8(c) shows contents of respective elements measured at the plurality of measurement points, respectively.

FIGS. 9(a) to 9(c) are views showing results of confirming the structural characteristics at an observation position different from those in FIGS. 6(a) through 8(c), where FIG.

9(a) shows an observation position by energy dispersive X-ray analysis in a bright field image with a scanning transmission electron microscope, FIG. 9(b) shows a plurality of measurement points in the observation position, and FIG. 9(c) shows contents of respective elements measured at the plurality of measurement points, respectively.

FIGS. 10(a) to 10(c) are views showing results of confirming the structural characteristics at an observation position different from those in FIGS. 6(a) through 9(c), where FIG. 10(a) shows an observation position by energy dispersive X-ray analysis in a bright field image with a scanning transmission electron microscope, FIG. 10(b) shows a plurality of measurement points in the observation position, and FIG. 10(c) shows contents of respective elements measured at the plurality of measurement points, respectively.

FIGS. 11(a) to 11(c) are views showing results of confirming the structural characteristics of a multilayer ceramic capacitor of the present invention containing $CaZrO_3$ as an auxiliary component, where FIG. 11(a) shows an observation position by energy dispersive X-ray analysis in a bright field image with a scanning transmission electron microscope, FIG. 11(b) shows a plurality of measurement points in the observation position, and FIG. 11(c) shows contents of respective elements measured at the plurality of measurement points, respectively.

FIGS. 12(a) to 12(c) are views showing results of confirming the structural characteristics at an observation position different from that in FIGS. 11(a)-11(c), where FIG. 12(a) shows an observation position by energy dispersive X-ray analysis in a bright field image with a scanning transmission electron microscope, FIG. 12(b) shows a plurality of measurement points in the observation position, and FIG. 12(c) shows contents of respective elements measured at the plurality of measurement points, respectively.

FIGS. 13(a) to 13(c) are views showing results of confirming the structural characteristics at an observation position different from those in FIGS. 11(a) through 12(c), where FIG. 13(a) shows an observation position by energy dispersive X-ray analysis in a bright field image with a scanning transmission electron microscope, FIG. 13(b) shows a plurality of measurement points in the observation position, and FIG. 13(c) shows contents of respective elements measured at the plurality of measurement points, respectively.

FIG. 14(a) shows an observation position by energy dispersive X-ray analysis in a bright field image with a scanning transmission electron microscope, FIG. 14(b) shows a plurality of measurement points in the observation position, and FIG. 14(c) shows contents of respective elements measured at the plurality of measurement points, respectively.

DETAILED DESCRIPTION OF THE INVENTION

Figure 1:
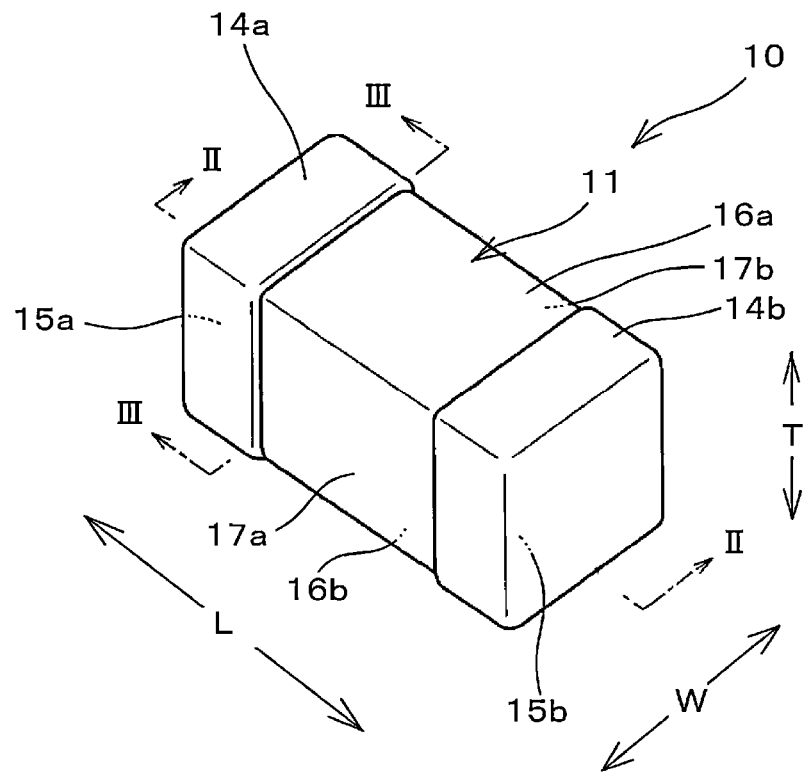
FIG. 1 is a perspective view of a multilayer ceramic capacitor.

Hereinafter, features of the present invention will be specifically described with reference to an embodiment of the present invention.

A dielectric composition of the present invention contains a first complex oxide represented by $(Bi_xNa_{1-x})TiO_3$—$CaTiO_3$ (x satisfies $0<x<1$) and having a perovskite structure as a main component; and at least one second complex oxide having a perovskite structure selected from the group consisting of $BaZrO_3$, $SrZrO_3$, $CaZrO_3$, $NaNbO_3$, and $NaTaO_3$ as an auxiliary component, and satisfies requirements (hereinafter, referred to as requirements of the present invention) that a tolerance factor t in a case of the at least one second complex oxide being $BaZrO_3$, $NaNbO_3$, or $NaTaO_3$ satisfies a relationship of $0.9016 \leq t \leq 0.9035$, a tolerance factor t in a case of the at least one second complex oxide being $SrZrO_3$ satisfies a relationship of $0.9005 \leq t \leq 0.9025$, and a tolerance factor t in a case of the at least one second complex oxide being $CaZrO_3$ satisfies a relationship of $0.9000 \leq t \leq 0.9020$. The complex oxide represented by $(Bi_xNa_{1-x})TiO_3$—$CaTiO_3$ and having a perovskite structure is a solid solution of $(Bi_xNa_{1-x})TiO_3$ and $CaTiO_3$.

In a complex oxide represented by $ABO_3$ and having a perovskite structure, when the ionic radius of the A site ion is designated as $R_A$, the ionic radius of the B site ion is designated as $R_B$, and the ionic radius of the oxygen ion is designated as $R_O$, the tolerance factor t is represented by the following formula (1):

$$t=(R_A+R_O)/(\sqrt{2}\times(R_B+R_O)) \qquad (1)$$

When a plurality of ions are contained in the A site, for each contained ion, the sum of all values obtained by multiplying the molar ratio of the contained ion to all ions contained in the A site and the ionic radius is regarded as the ionic radius $R_A$ of the A site ion. The same applies to the ionic radius $R_B$ when a plurality of ions are contained in the B site.

The ionic radius of Bi is 0.117 nm, the ionic radius of Na is 0.118 nm, the ionic radius of Ca is 0.112 nm, the ionic radius of Ti is 0.0605 nm, the ionic radius of Ba is 0.142 nm, the ionic radius of Sr is 0.126 nm, the ionic radius of Zr is 0.072 nm, the ionic radius of Nb is 0.064 nm, the ionic radius of Ta is 0.064 nm, and the ionic radius of O is 0.142 nm.

Examples

Preparation of Dielectric Composition

First, a material containing Bi, Na, Ba, Sr, Ca, Ti, Zr, Nb, and Ta was prepared. Here, raw material powders of $Bi_2O_3$, $Na_2CO_3$, $BaCO_3$, $SrCO_3$, $CaCO_3$, $TiO_2$, $ZrO_2$, $Nb_2O_5$, and $Ta_2O_5$ were prepared, mixed at a desired ratio, and mixed in a ball mill for 24 hours using water or an organic solvent such as ethanol as a medium. As the form of the raw material powder, there are forms such as an oxide and a compound that becomes an oxide in a firing stage, but any form may be used. The obtained mixture was evaporated to dryness, then heat-treated at 800 to 1000° C., and dry-pulverized to obtain a dielectric composition. Here, 32 kinds of dielectric compositions having different compositions were prepared.

The prepared 32 kinds of dielectric compositions each contain a first complex oxide represented by $(Bi_xNa_{1-x})TiO_3$—$CaTiO_3$ and having a perovskite structure as a main component. In the present embodiment, x is 0.5. At least one second complex oxide having a perovskite structure selected from the group consisting of $BaZrO_3$, $SrZrO_3$, $CaZrO_3$, $NaNbO_3$, and $NaTaO_3$ is contained as an auxiliary component according to the ratio of the mixed raw material powders. The main component is a component having the largest content ratio (weight ratio), and is contained, for example, in an amount of 90 wt % or more, preferably 95 wt % or more.

The main component and the auxiliary component contained in the dielectric composition can be determined by inductively coupled plasma atomic emission spectroscopy. A standard solution is used for quantification of each element, and a calibration curve is prepared in a known concentration range, so that a sample concentration can be relatively determined.

Preparation of Multilayer Ceramic Capacitor

A polyvinyl butyral-based binder and an organic solvent such as ethanol were added to the prepared dielectric composition, and wet-mixed in a ball mill for a predetermined time to prepare a ceramic slurry.

Subsequently, the prepared ceramic slurry was coated onto a PET film so as to have a thickness of 5 μm and dried to prepare a ceramic green sheet. Then, a conductive paste for an internal electrode was coated onto the prepared ceramic green sheet. Here, as the conductive paste for an internal electrode, a conductive paste containing Pt as a main component was used. As a metal contained in the conductive paste for an internal electrode, it is preferable to use a low-cost non-precious metal such as Cu or Ni. The method for coating the conductive paste for an internal electrode is not particularly limited, and here, the conductive paste for an internal electrode was coated by screen printing.

Subsequently, a predetermined number of ceramic green sheets not coated with the conductive paste for an internal electrode were laminated, a plurality of ceramic green sheets coated with the conductive paste for an internal electrode were laminated thereon, and a predetermined number of ceramic green sheets not coated with the conductive paste for an internal electrode were further laminated thereon, thereby obtaining a mother laminated body. The ceramic green sheets coated with the conductive paste for an internal electrode were laminated so that the conductive paste for an internal electrode was alternately drawn out.

Subsequently, the mother laminated body was pressed in the lamination direction and then cut into a predetermined size by a cutting method such as push cutting, cutting with a dicing machine, or laser to obtain a laminated chip.

Subsequently, a conductive paste for an external electrode was coated to both end surfaces of the laminated chip, and heated under a condition of 400° C. in the air atmosphere to fire the binder. As the conductive paste for an external electrode, a conductive paste containing Pt as a main component was used. After the firing of the binder, the laminated chip was fired at a temperature of 900° C. or higher and 1100° C. or lower in the air atmosphere. As long as the metals of the internal electrode and the external electrode are not oxidized, the atmosphere during firing is not limited to the air atmosphere.

After the firing of the laminated chip, the laminated chip may be coated with the conductive paste for an external electrode and then fired. A plating layer may be formed on the surface of the external electrode. The plating layer is formed, for example, by first forming a Ni plating layer and then forming a Sn plating layer.

Through the above processes, 32 kinds of multilayer ceramic capacitors were prepared according to 32 kinds of dielectric compositions.

Figure 2:
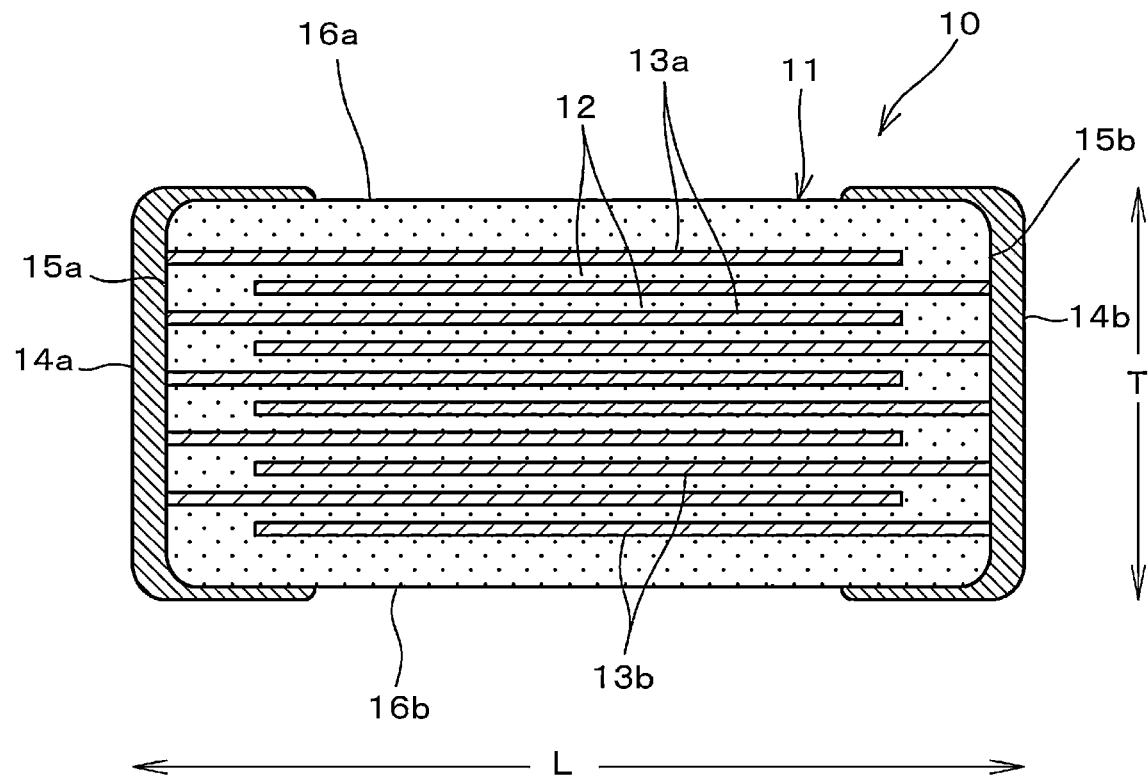
FIG. 2 is a sectional view of the multilayer ceramic capacitor illustrated in FIG. 1 taken along line II-II.
Figure 3:
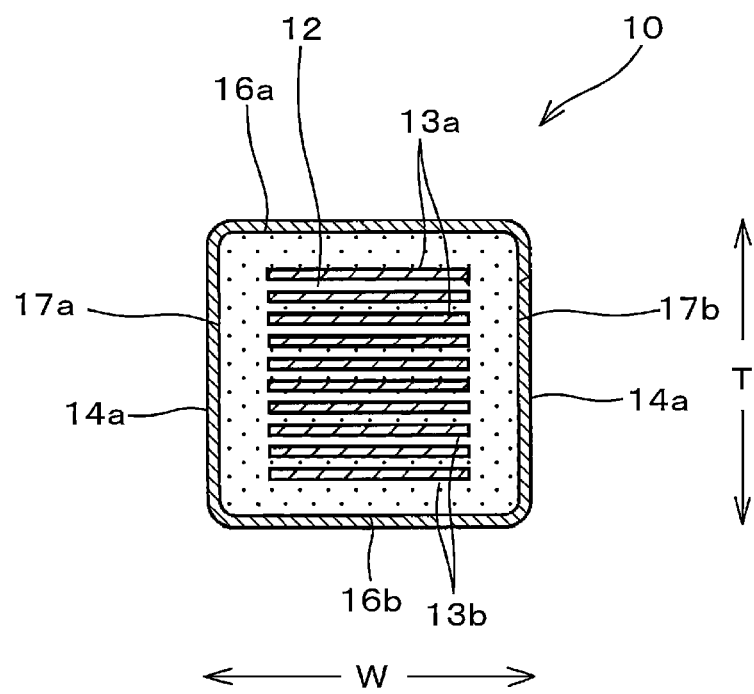
FIG. 3 is a sectional view of the multilayer ceramic capacitor illustrated in FIG. 1 taken along line III-III.

FIG. 1 is a perspective view of a multilayer ceramic capacitor 10 thus prepared. FIG. 2 is a sectional view of the multilayer ceramic capacitor 10 illustrated in FIG. 1 taken along line II-II. FIG. 3 is a sectional view of the multilayer ceramic capacitor 10 illustrated in FIG. 1 taken along line III-III.

As illustrated in FIGS. 1 to 3, the multilayer ceramic capacitor 10 is an electronic component having a rectangular parallelepiped shape as a whole, and includes a ceramic body 11 and a pair of external electrodes 14a and 14b. The pair of the external electrodes 14a and 14b is disposed so as to face each other as illustrated in FIG. 1.

Here, a direction in which the pair of external electrodes 14a and 14b faces each other is defined as a length direction L of the multilayer ceramic capacitor 10, a direction in which dielectric layers 12 and internal electrodes 13a and 13b described later are laminated is defined as a lamination direction T, and a direction orthogonal to both the length direction L and the lamination direction T is defined as a width direction W. Any two directions among the length direction L, the lamination direction T, and the width direction W are directions orthogonal to each other.

The ceramic body 11 has a first end surface 15a and a second end surface 15b facing each other in the length direction L, a first main surface 16a and a second main surface 16b facing each other in the lamination direction T, and a first side surface 17a and a second side surface 17b facing each other in the width direction W.

As illustrated in FIGS. 2 and 3, the ceramic body 11 includes a plurality of dielectric layers 12 and a plurality of internal electrodes 13a and 13b which are laminated. The internal electrodes 13a and 13b include a first internal electrode 13a and a second internal electrode 13b. The plurality of dielectric layers 12 and the plurality of internal electrodes 13a and 13b are alternately laminated. More specifically, the ceramic body 11 has a structure in which a plurality of the first internal electrodes 13a and a plurality of the second internal electrodes 13b are alternately laminated with the dielectric layers 12 interposed therebetween in the lamination direction T.

The dielectric layers 12 each contain the above-described dielectric composition.

The first internal electrodes 13a each are extended to the first end surface 15a of the ceramic body 11. The second internal electrodes 13b each are extended to the second end surface 15b of the ceramic body 11.

A first external electrode 14a is formed on the entire first end surface 15a of the ceramic body 11, and is formed so as to wrap around the first main surface 16a, the second main surface 16b, the first side surface 17a, and the second side surface 17b from the first end surface 15a. The first external electrode 14a is electrically connected to the first internal electrodes 13a.

A second external electrode 14b is formed on the entire second end surface 15b of the ceramic body 11, and is formed so as to wrap around the first main surface 16a, the second main surface 16b, the first side surface 17a, and the second side surface 17b from the second end surface 15b. The second external electrode 14b is electrically connected to the second internal electrodes 13b.

Evaluation (1. Length Measurement)

The prepared multilayer ceramic capacitor 10 was evaluated as follows.

The multilayer ceramic capacitor 10 was erected vertically such that the direction in which the pair of external electrodes 14a and 14b faced each other was the vertical direction, and the periphery of the multilayer ceramic capacitor 10 was fixed with a resin. Subsequently, a surface defined by the lamination direction T and the length direction L was polished to a center position in the width direction W of the multilayer ceramic capacitor 10 by a polishing machine to expose an LT section. In order to remove sagging of the internal electrodes 13a and 13b due to polishing, the polished surface was processed by ion milling after completion of polishing.

A WT section was exposed by the same method. That is, the multilayer ceramic capacitor 10 was erected vertically such that the direction in which the pair of external electrodes 14a and 14b faced each other was the vertical direction, and the periphery of the multilayer ceramic capacitor 10 was fixed with a resin. Subsequently, a surface defined by the lamination direction T and the width direction W was polished to a center position in the length direction L of the multilayer ceramic capacitor 10 by a polishing machine to expose the WT section. In order to remove sagging of the internal electrodes 13a and 13b due to polishing, the polished surface was processed by ion milling after completion of polishing.

Subsequently, the LT section was observed with a scanning electron microscope, and the thickness of the dielectric layer 12 was determined by the following method. First, an imaginary line orthogonal to the internal electrodes 13a and 13b was determined at a center position in the length direction L of the LT section. A region where the internal electrodes 13a and 13b were laminated was divided into three equal parts in the lamination direction T to obtain an upper region, an intermediate region, and a lower region. In each of the upper region, the intermediate region, and the lower region, the thickness of the dielectric layer 12 on the imaginary line was measured for each of three layers, and the average value of all the measured values was determined to be regarded as the thickness of the dielectric layer 12.

Subsequently, the LT section was observed with an optical microscope, and the dimension in the length direction L of the effective electrode portion, which is a region where the first internal electrode 13a and the second internal electrode 13b face each other, was determined by the following method.

First, in the LT section, the region where the internal electrodes 13a and 13b were laminated was divided into six regions by being divided into six equal parts in the lamination direction T, four regions at the center were defined as an intermediate region, a region above the intermediate region was defined as an upper region, and a region below the intermediate region was defined as a lower region. Subsequently, in each of the four regions included in the intermediate region, the dimension in the length direction L of the ceramic body 11 was determined, and the average value thereof was regarded as an L dimension.

In each of the four regions included in the intermediate region, the dimension in the length direction L from the first end surface 15a to the end of the second internal electrode 13b of the ceramic body 11 was determined, and the average value thereof was regarded as a first L gap dimension. In each of the four regions included in the intermediate region, the dimension in the length direction L from the second end surface 15b to the end of the first internal electrode 13a was determined, and the average value thereof was regarded as a second L gap dimension.

By subtracting the first L gap dimension and the second L gap dimension from the L dimension determined by the above-described method, the dimension in the length direction L of the effective electrode portion, which is a region where the first internal electrode 13a and the second internal electrode 13b face each other, was determined.

The WT section was observed with an optical microscope, and the dimension in the width direction W of the effective electrode portion was determined by the following method.

First, in the WT section, the region where the internal electrodes 13a and 13b were laminated was divided into six regions by being divided into six equal parts in the lamination direction T, four regions at the center were defined as an intermediate region, a region above the intermediate region was defined as an upper region, and a region below the intermediate region was defined as a lower region. Subsequently, in each of the four regions included in the intermediate region, the dimension in the width direction W of the ceramic body 11 was determined, and the average value thereof was regarded as a W dimension.

Subsequently, in each of the four regions included in the intermediate region, the dimension in the width direction W from the first end surface 15a to the ends of the first internal electrode 13a and the second internal electrode 13b of the ceramic body 11 was determined, and the average value thereof was regarded as a first W gap dimension. In each of the four regions included in the intermediate region, the dimension in the width direction W from the second end surface 15b to the ends of the first internal electrode 13a and the second internal electrode 13b was determined, and the average value thereof was regarded as a second W gap dimension.

By subtracting the first W gap dimension and the second W gap dimension from the W dimension determined by the above-described method, the dimension in the width direction W of the effective electrode portion was determined.

The area of the effective electrode portion was determined based on the dimension in the length direction L and the dimension in the width direction W of the effective electrode portion determined by the above-described methods.

(2. Composition Analysis)

Composition analysis was performed for each multilayer ceramic capacitor 10 by inductively coupled plasma atomic emission spectroscopy. A standard solution was used for quantification of each element, and a calibration curve was prepared in a known concentration range, so that a sample concentration was relatively determined. When the composition ratio of each element was calculated, element components contained in the internal electrodes 13a and 13b were excluded.

Here, regarding the molar ratio of each element when $(Bi_aNa_bBa_cSr_dCa_e)(Ti_fZr_gNb_hTa_i)O_3$ was used as a main component, the respective ratios when $f+g+h+i=1$ were determined.

(3. Electrical Characteristics)

Ten multilayer ceramic capacitors were prepared for each of 32 kinds of multilayer ceramic capacitors. Each of the prepared multilayer ceramic capacitors was placed in a metal container, held at 300° C. for 60 minutes, and then left to stand at 25° C. for 24 hours.

When an AC voltage of 1 kHz and 0.1 kV/mm and a DC voltage having an electric field intensity of 10 kV/mm were applied to the ten multilayer ceramic capacitors after the heat treatment for 60 seconds, the electrostatic capacitance was measured for the ten multilayer ceramic capacitors, and the average value thereof was determined. The measurement temperature was set at intervals of 5° C. in a range of −55° C. or higher and 125° C. or lower, and it was examined whether or not the standard X7T defined by The Electronic Industries Alliance (EIA) was satisfied. The standard X7T is a standard that the rate of change in electrostatic capacitance in a temperature range of −55° C. to 125° C. is −33% to 22%.

The relative permittivity was calculated from the electrostatic capacitance of the multilayer ceramic capacitor using the thickness of the dielectric layer 12 determined by the above-described method and the area of the effective electrode portion.

(4. Electric Field Endurance)

The electric field endurance when a DC bias was applied was measured at 25° C. The electric field endurance was determined by increasing the voltage applied to the multilayer ceramic capacitor at 100 V/s and measuring the voltage causing dielectric breakdown. Here, the electric field endurance was determined for the multilayer ceramic capacitors of Sample Nos. 5, 7, 9, 11, 13 to 16, 19 to 24, 27, 28, 30, and 32 shown in Tables 1A and 1B described below.

For the multilayer ceramic capacitors of Sample Nos. 1 to 32, the composition (molar ratio), the first auxiliary component, the second auxiliary component, the tolerance factor t, the relative permittivity at 25° C. under an electric field of 10 kV/mm, the result as to whether the rate of change in electrostatic capacitance under an electric field of 10 kV/mm satisfies the standard X7T, and the electric field endurance are shown in Tables 1A and 1B, respectively. A case where the standard X7T is satisfied is indicated as "o", and a case where the standard X7T is not satisfied is indicated as "x".

The multilayer ceramic capacitors of Sample Nos. 1, 2, 11 to 14, 28, and 29 in Tables 1A and 1B contain $BaZrO_3$ as a first auxiliary component. Among these multilayer ceramic capacitors, the tolerance factor t of each of the multilayer ceramic capacitors of Sample Nos. 11, 13, 14, and 28 satisfies the relationship of $0.9021 \le t \le 0.9033$. That is, the multilayer ceramic capacitors of Sample Nos. 11, 13, 14, and 28 are multilayer ceramic capacitors satisfying the requirements of the present invention since the tolerance factor t satisfies the relationship of $0.9016 \le t \le 0.9035$.

The multilayer ceramic capacitors of Sample Nos. 3, 4, and 23 to 27 in Tables 1A and 1B contain $SrZrO_3$ as a first auxiliary component. Among these multilayer ceramic capacitors, the tolerance factor t of each of the multilayer

TABLE 1A

| Sample No. | Bi | Na | Ba | Sr | Ca | Ti | Zr | Nb | Ta | First auxiliary component | Second auxiliary component | Tolerance factor t | Relative permittivity | Rate of change in capacitance X7T | Electric field endurance (kV/mm) |
|---|---|---|---|---|---|---|---|---|---|---|---|---|---|---|---|
| 1* | 0.425 | 0.425 | 0.03 | 0 | 0.12 | 0.97 | 0.03 | 0 | 0 | $BaZrO_3$ | Mn, Cu | 0.9049 | 671 | X | |
| 2* | 0.44 | 0.44 | 0.03 | 0 | 0.09 | 0.97 | 0.03 | 0 | 0 | $BaZrO_3$ | Mn, Cu | 0.9055 | 530 | X | |
| 3* | 0.425 | 0.425 | 0 | 0.03 | 0.12 | 0.97 | 0.03 | 0 | 0 | $SrZrO_3$ | Mn, Cu | 0.9032 | 848 | X | |
| 4* | 0.44 | 0.44 | 0 | 0.03 | 0.09 | 0.97 | 0.03 | 0 | 0 | $SrZrO_3$ | Mn, Cu | 0.9038 | 536 | X | |
| 5 | 0.425 | 0.425 | 0 | 0 | 0.18 | 0.97 | 0.03 | 0 | 0 | $CaZrO_3$ | Mn, Cu | 0.9018 | 1,121 | ○ | 55.3 |
| 6* | 0.44 | 0.44 | 0 | 0 | 0.12 | 0.97 | 0.03 | 0 | 0 | $CaZrO_3$ | Mn, Cu | 0.9024 | 1,024 | X | |
| 7 | 0.425 | 0.455 | 0 | 0 | 0.15 | 0.97 | 0 | 0.03 | 0 | $NaNbO_3$ | Mn, Cu | 0.9034 | 1,252 | ○ | 48.5 |
| 8* | 0.44 | 0.47 | 0 | 0 | 0.09 | 0.97 | 0 | 0.03 | 0 | $NaNbO_3$ | Mn, Cu | 0.9039 | 584 | X | |
| 9 | 0.425 | 0.455 | 0 | 0 | 0.12 | 0.97 | 0 | 0 | 0.03 | $NaTaO_3$ | Mn, Cu | 0.9034 | 1,214 | ○ | 49.8 |
| 10* | 0.44 | 0.47 | 0 | 0 | 0.09 | 0.97 | 0 | 0 | 0.03 | $NaTaO_3$ | Mn, Cu | 0.9039 | 719 | X | |
| 11 | 0.38 | 0.38 | 0.03 | 0 | 0.22 | 0.97 | 0.03 | 0 | 0 | $BaZrO_3$ | Mn, Cu | 0.9029 | 1,110 | ○ | 54.1 |
| 12* | 0.36 | 0.36 | 0.015 | 0 | 0.265 | 0.99 | 0.015 | 0 | 0 | $BaZrO_3$ | Mn, Cu | 0.9015 | 978 | ○ | |
| 13 | 0.37 | 0.37 | 0.015 | 0 | 0.245 | 0.98 | 0.015 | 0 | 0 | $BaZrO_3$ | Mn, Cu | 0.9021 | 1,138 | ○ | 70.2 |
| 14 | 0.39 | 0.39 | 0.015 | 0 | 0.205 | 0.98 | 0.015 | 0 | 0 | $BaZrO_3$ | Mn, Cu | 0.9027 | 1,258 | ○ | 68.3 |
| 15 | 0.41 | 0.41 | 0 | 0 | 0.18 | 0.97 | 0.03 | 0 | 0 | $CaZrO_3$ | Mn, Cu | 0.9013 | 1,069 | ○ | 64.9 |
| 16 | 0.41 | 0.41 | 0 | 0 | 0.18 | 0.95 | 0.05 | 0 | 0 | $CaZrO_3$ | Mn, Cu | 0.9003 | 1,215 | ○ | 49.3 |
| 17* | 0.40 | 0.40 | 0 | 0 | 0.20 | 0.95 | 0.05 | 0 | 0 | $CaZrO_3$ | Mn, Cu | 0.8999 | 980 | ○ | |
| 18* | 0.38 | 0.38 | 0 | 0 | 0.23 | 0.95 | 0.05 | 0 | 0 | $CaZrO_3$ | Mn, Cu | 0.8993 | 921 | ○ | |
| 19 | 0.40 | 0.43 | 0 | 0 | 0.17 | 0.97 | 0 | 0.03 | 0 | $NaNbO_3$ | Mn, Cu | 0.9025 | 1,112 | ○ | 63.5 |
| 20 | 0.38 | 0.44 | 0 | 0 | 0.18 | 0.95 | 0 | 0.05 | 0 | $NaNbO_3$ | Mn, Cu | 0.9020 | 1,080 | ○ | 66.5 |

TABLE 1B

| Sample No. | Bi | Na | Ba | Sr | Ca | Ti | Zr | Nb | Ta | First auxiliary component | Second auxiliary component | Tolerance factor t | Relative permittivity | Rate of change in capacitance X7T | Electric field endurance (kV/mm) |
|---|---|---|---|---|---|---|---|---|---|---|---|---|---|---|---|
| 21 | 0.40 | 0.45 | 0 | 0 | 0.15 | 0.95 | 0 | 0.05 | 0 | $NaNbO_3$ | Mn, Cu | 0.9026 | 1,136 | ○ | 61.7 |
| 22 | 0.41 | 0.46 | 0 | 0 | 0.13 | 0.95 | 0 | 0.05 | 0 | $NaNbO_3$ | Mn, Cu | 0.9030 | 1,239 | ○ | 55.2 |
| 23 | 0.365 | 0.365 | 0 | 0.03 | 0.24 | 0.97 | 0.03 | 0 | 0 | $SrZrO_3$ | Mn, Cu | 0.9009 | 1,292 | ○ | 53.3 |
| 24 | 0.375 | 0.375 | 0 | 0.05 | 0.20 | 0.95 | 0.05 | 0 | 0 | $SrZrO_3$ | Mn, Cu | 0.9013 | 1,159, | ○ | 64.0 |
| 25* | 0.35 | 0.35 | 0 | 0.05 | 0.25 | 0.95 | 0.05 | 0 | 0 | $SrZrO_3$ | Mn, Cu | 0.9003 | 973 | ○ | |
| 26* | 0.415 | 0.415 | 0 | 0.05 | 0.12 | 0.95 | 0.05 | 0 | 0 | $SrZrO_3$ | Mn, Cu | 0.9028 | 1,106 | × | |
| 27 | 0.405 | 0.405 | 0 | 0.03 | 0.16 | 0.97 | 0.03 | 0 | 0 | $SrZrO_3$ | Mn, Cu | 0.9025 | 1,216 | ○ | 48.4 |
| 28 | 0.36 | 0.36 | 0.05 | 0 | 0.23 | 0.95 | 0.05 | 0 | 0 | $BaZrO_3$ | Mn, Cu | 0.9033 | 1,148 | ○ | 52.1 |
| 29* | 0.37 | 0.37 | 0.05 | 0 | 0.21 | 0.95 | 0.05 | 0 | 0 | $BaZrO_3$ | Mn, Cu | 0.9037 | 1,127 | × | |
| 30 | 0.375 | 0.445 | 0 | 0 | 0.18 | 0.93 | 0 | 0 | 0.07 | $NaTaO_3$ | Mn, Cu | 0.9017 | 1,012 | ○ | 57.1 |
| 31* | 0.365 | 0.425 | 0 | 0 | 0.21 | 0.94 | 0 | 0 | 0.06 | $NaTaO_3$ | Mn, Cu | 0.9013 | 975 | ○ | |
| 32 | 0.365 | 0.515 | 0 | 0 | 0.12 | 0.85 | 0 | 0 | 0.15 | $NaTaO_3$ | Mn, Cu | 0.9018 | 1,038 | ○ | 50.3 |

In Tables 1A and 1B, samples with Sample No. marked with * are multilayer ceramic capacitors that do not satisfy the requirements of the present invention, samples with Sample No. not marked with * are multilayer ceramic capacitors that satisfy the requirements of the present invention. All of the multilayer ceramic capacitors of Sample Nos. 1 to 32 contain a complex oxide represented by $(Bi_{0.5}Na_{0.5})TiO_3$—$CaTiO_3$ and having a perovskite structure as a main component.

ceramic capacitors of Sample Nos. 23, 24, and 27 satisfies the relationship of $0.9009 \le t \le 0.9025$. That is, the multilayer ceramic capacitors of Sample Nos. 23, 24, and 27 are multilayer ceramic capacitors satisfying the requirements of the present invention since the tolerance factor t satisfies the relationship of $0.9005 \le t \le 0.9025$.

The multilayer ceramic capacitors of Sample Nos. 5, 6, and 15 to 18 in Tables 1A and 1B contain $CaZrO_3$ as an auxiliary component. Among these multilayer ceramic capacitors, the tolerance factor t of each of the multilayer ceramic capacitors of Sample Nos. 5, 15, and 16 satisfies the relationship of 0.9003≤t≤0.9018. That is, the multilayer ceramic capacitors of Sample Nos. 5, 15, and 16 are multilayer ceramic capacitors satisfying the requirements of the present invention since the tolerance factor t satisfies the relationship of 0.9000≤t≤0.9020.

The multilayer ceramic capacitors of Sample Nos. 7, 8, and 19 to 22 in Tables 1A and 1B contain NaNbO$_3$ as a first auxiliary component. Among these multilayer ceramic capacitors, the tolerance factor t of each of the multilayer ceramic capacitors of Sample Nos. 7 and 19 to 22 satisfies the relationship of 0.9020≤t≤0.9034. That is, the multilayer ceramic capacitors of Sample Nos. 7 and 19 to 22 are multilayer ceramic capacitors satisfying the requirements of the present invention since the tolerance factor t satisfies the relationship of 0.9016≤t≤0.9035.

The multilayer ceramic capacitors of Sample Nos. 9, 10, and 30 to 32 in Tables 1A and 1B contain NaTaO$_3$ as an auxiliary component. Among these multilayer ceramic capacitors, the tolerance factor t of each of the multilayer ceramic capacitors of Sample Nos. 9, 30, and 32 satisfies the relationship of 0.9017≤t≤0.9034. That is, the multilayer ceramic capacitors of Sample Nos. 9, 30, and 32 are multilayer ceramic capacitors satisfying the requirements of the present invention since the tolerance factor t satisfies the relationship of 0.9016≤t≤0.9035.

As shown in Tables 1A and 1B, the multilayer ceramic capacitors satisfying the requirements of the present invention have a relative permittivity at 25° C. under an electric field of 10 kV/mm of 1000 or more and have a rate of change in electrostatic capacitance under an electric field of 10 kV/mm satisfying the standard X7T. On the other hand, the multilayer ceramic capacitors not satisfying the requirements of the present invention do not satisfy at least one of the requirement that the relative permittivity at 25° C. under an electric field of 10 kV/mm is 1000 or more and the requirement that the rate of change in electrostatic capacitance under an electric field of 10 kV/mm satisfies the standard X7T.

The dielectric composition containing the complex oxide represented by $(Bi_xNa_{1-x})TiO_3$ has a high relative permittivity with respect to a high DC bias, but has a large temperature dependence of the electrostatic capacitance in a low temperature region, and the temperature at which the relative permittivity maximizes is a high temperature close to 400° C. On the other hand, the temperature at which the relative permittivity maximizes is lower in the dielectric composition containing the complex oxide represented by $(Bi_xNa_{1-x})TiO_3$—$CaTiO_3$ than in the dielectric composition containing the complex oxide represented by $(Bi_xNa_{1-x})TiO_3$. This is because the tolerance factor t in the case of containing Ca decreases, and the temperature at which the relative permittivity maximizes decreases as the tolerance factor t decreases. When the dielectric composition contains at least one complex oxide having a perovskite structure selected from the group consisting of BaZrO$_3$, SrZrO$_3$, CaZrO$_3$, NaNbO$_3$, and NaTaO$_3$ as an auxiliary component, the rate of change in electrostatic capacitance with respect to a change in temperature can be reduced. The reason for this is considered that the maximum temperatures of the main component and the auxiliary component are different from each other, and the rate of change in electrostatic capacitance of the entire composition can be reduced by increasing the components contained in the dielectric composition.

Figure 4:
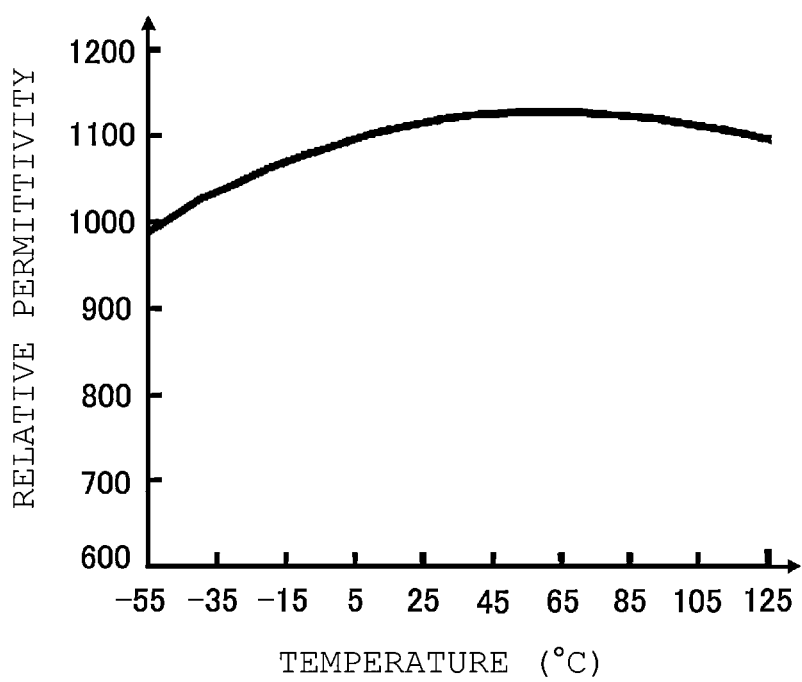
FIG. 4 is a view showing a change in relative permittivity of a multilayer ceramic capacitor of Sample No. 5 in a temperature range of −55° C. or higher and 125° C. or lower.

FIG. 4 is a view showing a change in relative permittivity of a multilayer ceramic capacitor of Sample No. 5 in a temperature range of −55° C. to 125° C.

Figure 5A:
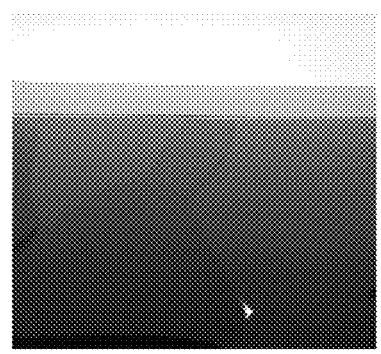
FIG. 5(a) is a view showing a bright field image when a multilayer ceramic capacitor of the present invention containing $BaZrO_3$ as an auxiliary component is observed using a scanning transmission electron microscope (STEM)
Figure 5B:
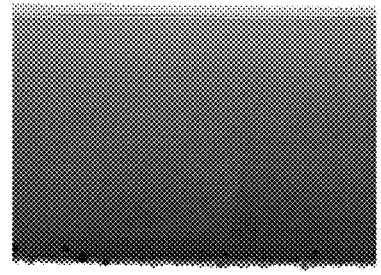
FIG. 5(b) is a view showing a bright field image when a multilayer ceramic capacitor of the present invention containing $CaZrO_3$ as an auxiliary component is observed using a scanning transmission electron microscope (STEM).
Figures 14A, 14B, 14C:
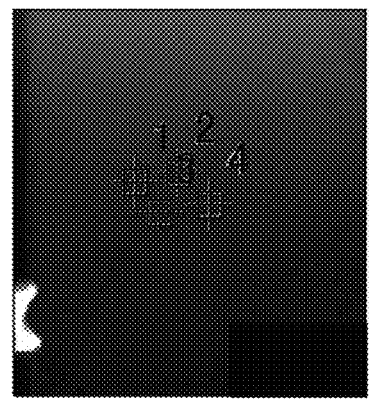
FIGS. 14(a) to 14(c) are views showing results of confirming the structural characteristics at an observation position different from those in FIGS. 11(a) through 13(c), where

The structural characteristics of the dielectric layer 12 of the multilayer ceramic capacitor satisfying the requirements of the present invention were confirmed. FIG. 5(a) is a view showing a bright field image when a multilayer ceramic capacitor containing BaZrO$_3$ as an auxiliary component is observed using a scanning transmission electron microscope, and FIG. 5(b) is a view showing a bright field image when a multilayer ceramic capacitor containing CaZrO$_3$ as an auxiliary component is observed using a scanning transmission electron microscope. The measurement magnification is 40000 times in both cases.

FIGS. 6(a) to 10(c) are views showing results of confirming the structural characteristics of a multilayer ceramic capacitor containing BaZrO$_3$ as an auxiliary component, where FIGS. 6(a), 7(a), 8(a), 9(a) and 10(a) show an observation position by energy dispersive X-ray analysis (EDX) in a bright field image with a scanning transmission electron microscope, FIGS. 6(b), 7(b), 8(b), 9(b) and 10(b) show a plurality of measurement points in the observation position shown in FIGS. 6(a), 7(a), 8(a), 9(a) and 10(a), and FIGS. 6(c), 7(c), 8(c), 9(c) and 10(c) show contents of respective elements at the plurality of measurement points, respectively. However, the numerical value (atom %) in FIGS. 6(c), 7(c), 8(c), 9(c) and 10(c) is an approximate value corrected using the sensitivity coefficient registered in the measurement device, and is not an absolute value.

As shown in FIG. 6(c), FIG. 7(c), and FIG. 8(c), in the multilayer ceramic capacitor satisfying the requirements of the present invention and containing BaZrO$_3$ as an auxiliary component, Ca is contained more inside the grain than at the grain boundary. The grain boundary is a boundary of particles and also includes a triple point that is a grain boundary surrounded by at least three particles. Here, the center of the measurement spot was aligned with the portion where the crystal orientation was changed, and the measurement was performed at the grain boundary. The term "inside the grain" refers to the inside of a particle, and the measurement was performed with a region other than the grain boundary as the inside of the grain. The position where Ca inside the grain is measured is preferably a position where no grain boundary exists in the depth direction. Similarly, the position where Ca at the grain boundary is measured is preferably a position where the inside of the grain does not exist in the depth direction.

As shown in FIGS. 6(c) to 10(c), in the multilayer ceramic capacitor containing BaZrO$_3$ as an auxiliary component, Zr tends to be contained more at the center portion inside the grain. On the other hand, Ba tends to be substantially uniformly contained at the grain boundary and inside the grain.

FIGS. 11(a) to 14(c) are views showing results of confirming the structural characteristics of a multilayer ceramic capacitor containing CaZrO$_3$ as an auxiliary component, where FIGS. 11(a), 12(a), 13(a), and 14(a) show an observation position by energy dispersive X-ray analysis (EDX) in a bright field image with a scanning transmission electron microscope, FIGS. 11(b), 12(b), 13(b), and 14(b) show a plurality of measurement points in the observation position shown in FIGS. 11(a), 12(a), 13(a), and 14(a), and FIGS. 11(c), 12(c), 13(c), and 14(c) show contents of respective elements at the plurality of measurement points, respectively. Also, the numerical value (atom %) in FIGS. 11(c), 12(c), 13(c), and 14(c) is an approximate value corrected using the sensitivity coefficient registered in the measurement device, and is not an absolute value.

As shown in FIG. 11(c), in the multilayer ceramic capacitor containing CaZrO$_3$ as an auxiliary component, Ca is contained more inside the grain than at the grain boundary. Zr is mostly present inside the grain, and tends to be hardly present at the grain boundary. In "Measurement point 2" in FIG. 14, Zr is segregated, and a very large amount of Zr is contained.

The measurement conditions of the scanning transmission electron microscope (STEM) and the measurement conditions of the energy dispersive X-ray analysis (EDX) described above are shown in Table 2. In the measurement, FE-TEM/EDX "JEM-F200/Noran System 7" manufactured by JEOL Ltd. was used, a biaxially inclined holder made of beryllium was used as a sample holder, and Mo mesh was used as a sample support base.

TABLE 2

| STEM measurement conditions | Acceleration voltage | 200 kV |
|---|---|---|
| | Focusing lens aperture | #3 |
| | Pre-treatment etc. | Pt coating |
| EDX measurement conditions | Spot diameter | 5 |
| | Time constant | Rate 1 |
| | Number of integrations | 100 times |

Although not illustrated in the drawings, the structural characteristics of the dielectric layer 12 of the multilayer ceramic capacitor containing $NaNbO_3$ were also confirmed. As for the multilayer ceramic capacitor satisfying the requirements of the present invention and containing $BaZrO_3$, $CaZrO_3$, or $NaNbO_3$ as an auxiliary component, the results of summarizing the positions where respective elements Ca, Ba, Zr, and Nb exist are shown in Table 3. In Table 3, the positions of the respective elements Ba, Zr, and Nb mean that the respective elements tend to be as described above.

TABLE 3

| | Ca | Ba | Zr | Nb |
|---|---|---|---|---|
| $BaZrO_3$ | More inside grain than at grain boundary | Substantially uniform | More at center portion inside grain | |
| $CaZrO_3$ | More inside grain than at grain boundary | | Mostly present inside grain, hardly present at grain boundary | |
| $NaNbO_3$ | More inside grain than at grain boundary | | | Substantially uniform |

As shown in Table 3, in the multilayer ceramic capacitor satisfying the requirements of the present invention and containing $BaZrO_3$, $CaZrO_3$, or $NaNbO_3$ as an auxiliary component, Ca is contained more inside the grain than at the grain boundary. Although not shown in Table 3, also in the multilayer ceramic capacitor satisfying the requirements of the present invention and containing $SrZrO_3$ or $NaTaO_3$ as an auxiliary component, Ca is contained more inside the grain than at the grain boundary.

It was confirmed that in the multilayer ceramic capacitor containing $NaNbO_3$ as an auxiliary component, Nb tends to be substantially uniformly contained at the grain boundary and inside the grain.

As shown in Tables 1A and 1B, in the multilayer ceramic capacitors of Sample Nos. 5, 7, 9, 11, 13 to 16, 19 to 24, 27, 28, 30, and 32 satisfying the requirements of the present invention, the electric field endurance was 48.4 kV/mm or more. This electric field endurance is higher than the electric field endurance of the multilayer ceramic capacitor described in Patent Document 1. The reason for this is as follows. That is, in the multilayer ceramic capacitor satisfying the requirements of the present invention, since Ca is contained more inside the grain than at the grain boundary, Ca having a small ionic radius is less at the grain boundary, and the crystal lattice is large. Therefore, the Ti—O distance of the crystal lattice becomes long and the band gap becomes wide, and accordingly, a component having a high resistance shares a voltage, so that the electric field endurance becomes high.

The multilayer ceramic capacitor satisfying the requirements of the present invention preferably further contains at least one selected from the group consisting of Cu, Ni, Mn, Mg, and Al as second auxiliary component in an amount of more than 0 parts by mol and 5 parts by mol or less with respect to 100 parts by mol of Ti. When at least one selected from the group consisting of Cu, Ni, Mn, Mg, and Al is contained in an amount of more than 0 parts by mol and 5 parts by mol or less with respect to 100 parts by mol of Ti, sufficient insulating properties can be maintained when a multilayer ceramic capacitor is produced by firing in a reducing atmosphere. The multilayer ceramic capacitors of Sample Nos. 1 to 32 shown in Tables 1A and 1B contain Mn and Cu as a second auxiliary component.

The present invention is not limited to the above embodiment, and various applications and modifications can be made within the scope of the present invention. For example, the multilayer ceramic capacitors of Sample Nos. 1 to 32 have been described as the multilayer ceramic capacitor containing the complex oxide represented by $(Bi_xNa_{1-x})TiO_3$—$CaTiO_3$ (x is 0.5) and having a perovskite structure as a main component, but x is not limited to 0.5 as long as 0<x<1 is satisfied.

DESCRIPTION OF REFERENCE SYMBOLS

10: Multilayer ceramic capacitor
11: Ceramic body
12: Dielectric layer
13a: First internal electrode
13b: Second internal electrode
14a: First external electrode
14b: Second external electrode

The invention claimed is:

1. A dielectric composition comprising:
   a first oxide represented by $(Bi_xNa_{1-x}) TiO_3$—$CaTiO_3$, wherein 0<x<1 and having a perovskite structure as a main component; and
   at least one second oxide having a perovskite structure selected from the group consisting of $BaZrO_3$, $SrZrO_3$, $CaZrO_3$, $NaNbO_3$, and $NaTaO_3$ as an auxiliary component, wherein
   when the at least one second oxide is $BaZrO_3$, $NaNbO_3$, or $NaTaO_3$, a tolerance factor t is 0.9016≤t≤0.9035,
   when the at least one second oxide is $SrZrO_3$, the tolerance factor t is 0.9005≤t≤0.9025, and
   when the at least one second oxide is $CaZrO_3$, the tolerance factor t is 0.9000≤t≤0.9020.

2. The dielectric composition according to claim 1, wherein the x is 0.5.

3. The dielectric composition according to claim 1, further comprising at least one selected from the group consisting of Cu, Ni, Mn, Mg, and Al in an amount of more than 0 parts by mol and 5 parts by mol or less with respect to 100 parts by mol of Ti.

4. The dielectric composition according to claim 1, wherein Ca is contained more inside a grain than at a grain boundary of the dielectric composition.

5. The dielectric composition according to claim 4, wherein Zr is contained more inside the grain than at the grain boundary of the dielectric composition.

6. The dielectric composition according to claim 1, wherein Zr is contained more inside a grain than at a grain boundary of the dielectric composition.

7. The dielectric composition according to claim 1, wherein the first oxide is contained in an amount of 90 wt % or more in the dielectric composition.

8. The dielectric composition according to claim 1, wherein the first oxide is contained in an amount of 95 wt % or more in the dielectric composition.

9. A multilayer ceramic capacitor comprising:
a plurality of dielectric layers and internal electrodes alternately laminated, wherein
each of the dielectric layers contains the dielectric composition according to claim 1.

10. The multilayer ceramic capacitor according to claim 9, wherein the x is 0.5.

11. The multilayer ceramic capacitor according to claim 9, wherein the dielectric composition further comprised at least one selected from the group consisting of Cu, Ni, Mn, Mg, and Al in an amount of more than 0 parts by mol and 5 parts by mol or less with respect to 100 parts by mol of Ti.

12. The multilayer ceramic capacitor according to claim 9, wherein Ca is contained more inside a grain than at a grain boundary of the dielectric composition.

13. The multilayer ceramic capacitor according to claim 12, wherein Zr is contained more inside the grain than at the grain boundary of the dielectric composition.

14. The multilayer ceramic capacitor according to claim 9, wherein Zr is contained more inside a grain than at a grain boundary of the dielectric composition.

15. The multilayer ceramic capacitor according to claim 9, wherein the first oxide is contained in an amount of 90 wt % or more in the dielectric composition.

16. The multilayer ceramic capacitor according to claim 9, wherein the first oxide is contained in an amount of 95 wt % or more in the dielectric composition.

\* \* \* \* \*